June 25, 1929.  W. DUBILIER  1,718,278
CONDENSER
Filed Feb. 14, 1924
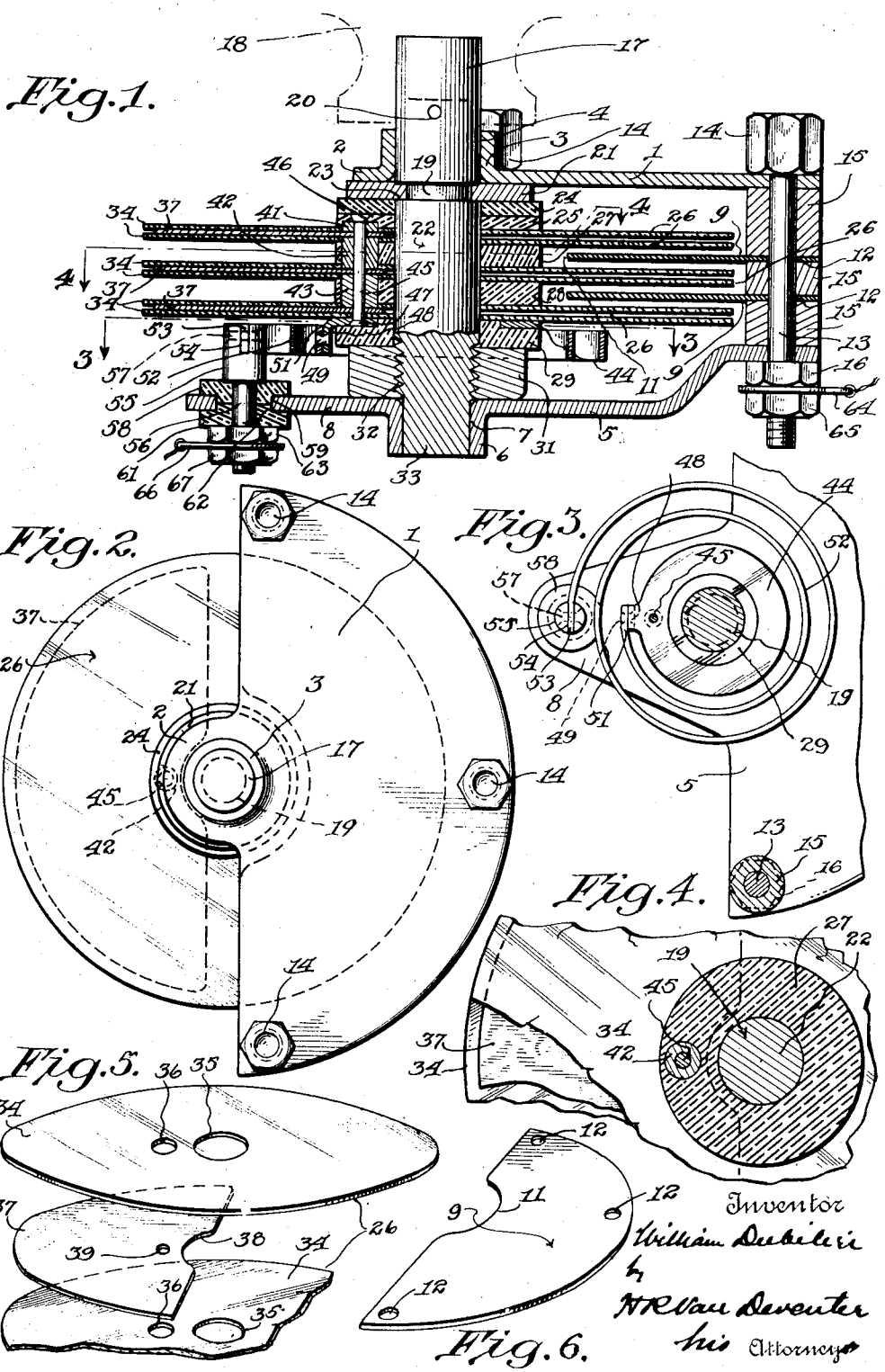
Inventor
William Dubilier
by H. R. Van Deventer
his Attorney Patented June 25, 1929.

1,718,278

UNITED STATES PATENT OFFICE.

WILLIAM DUBILIER, OF NEW YORK, N. Y., ASSIGNOR TO DUBILIER CONDENSER CORPORATION, A CORPORATION OF DELAWARE.

CONDENSER.

Application filed February 14, 1924. Serial No. 692,867.

My invention relates to condensers, and more particularly it relates to condensers in which the capacity may be gradually varied.

An object of my invention is to provide a condenser which is compact in construction and quickly assembled, and in which the fixed elements, which cooperate with flexible movable elements may be readily removed and repaired or replaced.

A further object of my invention is to provide a condenser structure in which the contact between the terminals of the movable elements is effected without any danger of short-circuiting the movable and the fixed elements, and which at the same time permits easy adjustment of the capacity value from maximum to minimum.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a vertical section taken through the axis of the rotor of my preferred form of condenser;

Fig. 2 is a top plan view of the form shown in Fig. 1;

Fig. 3 is a detail view taken on the line 3—3 of Fig. 1, looking in the direction of the arrows;

Fig. 4 is a detail view taken on the line 4—4 of Fig. 1, looking in the direction of the arrows;

Fig. 5 is an exploded view in perspective of the rotatable element of the form of condenser shown in Fig. 1;

Fig. 6 is a perspective view of one form of fixed element which I may use in the form of condenser shown in Fig. 1.

Referring to the drawings, I have shown an upper supporting plate 1, of arcuate configuration, having a centrally extending portion 2 above which protrudes an annular collar 3 surrounding an aperture 4. There is provided a lower supporting plate 5 having a downwardly projecting annular collar 6 formed therein, which surrounds a central aperture 7. The lower supporting plate 5 is provided with a projecting portion 8 to hold one of the terminals of the condenser, as will be later described.

Metallic arcuate fixed condenser elements 9 are provided with cut out portions 11 to clear the rotor carrying the movable elements, as will be more fully set forth, and with holes 12 therein through which are adapted to pass assembly rods 13, having bolt heads 14. Metallic spacers or bushings 15 are provided for properly spacing the fixed metallic condenser plates 9, which latter are assembled as follows: by passing the assembly rods 13 through the upper supporting plate 1, through the spacers 15 and the apertures 12 in the fixed condenser plates 9, and through apertures formed in the lower supporting plate 5. The whole is then held in position by means of nuts 16 mounted on the lower ends of the assembly rods 13.

Adapted to be journaled in the aperture 4 formed in the collar 3 on the supporting plate 1, is an operating shaft 17 capable of being rotated by an operating knob 18, diagrammatically indicated in dotted lines. The shaft 17 is provided with a central aperture into which projects the upper end of a shaft 19. The shaft 19 is keyed to the shaft 17 by means of a pin 20 passing through the shafts. Mounted below the lower end of the shaft 17 is a metallic friction plate 21 which surrounds the shaft 19. The shaft 19 is provided with an enlargement 22 forming a shoulder 23, and the friction plate 21 is firmly held between the shoulder 23 and the bottom of the shaft 17. The friction plate 21 is adapted to bear against the lower side of the supporting plate 1 of my condenser.

Mounted just below the friction plate on the enlarged portion 22 of the shaft 19, is an insulating washer 24, and below that another insulating washer 25. Below the insulating washer 25 is mounted one of the flexible movable elements 26 of my condenser, which overlies and is in close proximity to the upper fixed element 9 of my condenser. Below the upper flexible movable element is another insulating washer 27, followed by another flexible movable element 26. Below this is an insulating washer 28, followed by another flexible movable element 26.

The flexible movable elements 26 interleave with the fixed elements 9 of the condenser, and are in close proximity thereto. In fact, in many cases there will be a sliding contact between the flexible movable elements 26 and the fixed elements 9. Below the bottom flexible movable element 26 is another insulating washer 29. The whole shaft assembly is held in place by means of a compression nut 31, which is screw-threaded at 32 to the bottom of the shaft 22. The shaft 22 is provided with an extension 33 of slightly diminished diameter which fits within the aperture 7 formed in the collar 6 of the lower supporting plate 5. This whole shaft assembly just described comprises the rotor of my condenser.

Referring to Fig. 5, each of the flexible elements 26 comprises a thin sheet of mica 34 provided with a central aperture 35, through which passes the enlarged portion 22 of the shaft. The mica sheets 34 are provided with apertures 36 offset from the central apertures 35. Adapted to fit between the mica sheets 34 is a sheet of metallic foil 37 of substantially semi-circular configuration, having a cut out portion 38 therein to insure that the foil does not touch the enlarged portion 22 of the shaft. The foil 37 is provided with a hole 39, adapted to lie opposite the holes 36 of the mica sheets, but of somewhat smaller size than the holes 36. To insure that the foil 37 shall not be injured, it is made of slightly smaller size than the mica sheets 34, thus leaving a margin of mica projecting around the outer edge of the metal foil 37.

A short metallic bushing 41 fits into an annular depression formed in the lower side of the insulating washer 25. The bushing 41 extends slightly beyond the lower surface of the insulating washer 25 and contacts with the metal foil 37 of the first of the flexible elements 26, passing through the aperture 36 in the mica sheet 34. A metallic bushing 42, adapted to pass through the aperture in the insulating washer 27, has its upper end extending through the aperture 36 formed in the lower mica sheet 34 of the upper flexible condenser element, and contacts with the lower side of the metal foil 37. At its lower end, the metallic bushing 42 extends through the aperture 36 in the upper mica sheet 34 of the middle flexible element.

Adapted to pass through an aperture formed in the insulating washer 28 is another metallic bushing 43, whose upper end extends through the aperture 36 formed in the lower mica sheet 34 of the middle flexible element 26. The lower end of the metallic bushing 43 projects through the aperture 36 formed in the upper mica sheet 34 of the lower flexible condenser element 26 and contacts with the foil 37 of that element. A contact washer 44 rests in an annular recess formed in the insulating washer 29.

A holding pin 4 passes through apertures formed in the bushings 41, 42, 43 and through the apertures 39 formed in the strips of metallic foil 37. The bottom mica disk of the lowermost flexible condenser element 26 has its hole 36 of somewhat smaller diameter than is the hole 36 of the upper mica disk of this condenser element. This is because it is not necessary to have a bushing project through that mica disk to make contact with the foil of that element.

The holding pin 45 has its head 46 sunk into an aperture in the upper side of the insulating washer 25, and the top of the head 46 is even with the top of the holding washer 25. The bottom of the holding pin 45 passes through an aperture formed in the contact washer 44, and is riveted in place, as indicated at 47, the lower end of the riveted portion being even with the lower surface of the contact washer 44. Thus, electrical connection is made with all of the sheets of foil 37 in the movable elements 26. The cut out portion 38 prevents contact of the foil members 37 with the enlarged portion 22 of the shaft 19.

The contact washer 44 is provided with a downwardly extending lip 48, to which is riveted, by means of a rivet 49, an end 51 of a spiral spring 52, which encircles at its base the rotor carrying the movable condenser elements 26, as is clearly seen in Figs. 1 and 3. The other end 53 of the spiral spring 52 fits into a slot 54 formed in the enlarged upper end 55 of a binding post 56. The end 53 of the spring 52 is held in the slot 54 by means of a rivet 57. The bottom of the enlarged end 55 of the binding post 56 rests against an insulating washer 58 provided with an exterior shoulder 59, which projects into an aperture formed in the extension 8 of the lower supporting plate 5. A complemental insulating washer 61 fits over the binding post 56, and has a shoulder 62 which projects upwardly through the aperture formed in the extension 8. A nut 63 holds the binding post and insulating washers firmly in position.

Contact is made with the fixed condenser elements through one of the assembly rods 13, preferably the middle one, by passing a terminal 64 over the downwardly projecting screw-threaded lower end of the assembly rod 13 and securing a nut 65 thereover to hold the terminal 64 firmly between the nut 16 and the nut 65. Electrical connection is made with the movable condenser elements 26 by passing a terminal 66 over the downwardly projecting screw-threaded end of the binding post 58, and securing a nut 67 over the end of the binding post to hold the terminal 66 between the nut 63 and the nut 67.

In operation, by rotating the operating knob 18, adjustment of the capacity from minimum to maximum may be made by rotating the portions of the flexible elements 26 which contains the metal foil sheets 37 between the fixed condenser elements 9. In the view shown in Figs. 1 and 2, the condenser is set at minimum capacity, since the metallic foil at no portion interleaves with the fixed elements 9. Greatest capacity is obtained when the rotor assumes a position 180° removed from the position shown in Figs. 1 and 2 of the drawings.

By reason of the flexibility of the movable elements 26, in the motion of rotation, the flexible elements will compensate for inequalities in the surface of the fixed elements 9, and the operation of the condenser will be smooth and even. Moreover, the mica dust generated in those cases where there is a frictional engagement, will tend to act as a lubricant between the fixed and movable elements. It will be understood that the fixed and movable elements are substantially in contact with each other, though they are indicated as separated a considerable distance in the drawings, for the purposes of simplicity in illustration. The rotor can freely move and yet electrical contact will always be made with the movable elements by reason of the helical spring 52, which winds up and unwinds in adjusting the condenser to obtain different capacity values.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A variable condenser comprising, fixed elements, rotatable elements adapted to move between the fixed elements, a shaft, a rotatable means including insulating spacers between which the rotatable elements are mounted, means electrically insulated from the shaft for making electrical connection with the rotatable elements including a terminal, and a yielding connection between the terminal and the rotatable elements to obviate the insulation of said shaft from the fixed elements.

2. A variable condenser comprising fixed elements, rotatable elements adapted to move between the fixed elements, a shaft, a rotatable means including insulating spacers between which the rotatable elements are mounted, means electrically insulated from the shaft for making electrical connection with the rotatable elements including a terminal, and a spiral spring connected with the rotatable elements and the terminal.

3. In a variable condenser, fixed elements, rotatable elements adapted to move between the fixed elements comprising metallic foil between insulating mica disks, a shaft, a rotatable means including insulating spacers between which the rotatable elements are mounted, means electrically insulated from the shaft for making electrical connection with the rotatable elements including a terminal, and a spiral spring connecting with the rotatable elements and the terminal.

4. In a variable condenser, fixed elements, rotatable elements adapted to move between the fixed elements comprising metallic foil between mica disks, a shaft, a rotatable means including insulating spacers between which the rotatable elements are mounted, metallic bushings making contact with the metallic coil of the rotatable elements, a holding pin for the metallic bushings, a terminal insulated from the fixed elements, and a spiral spring electrically connected with the terminal and the metallic bushings.

5. A variable condenser comprising a fixed element, a rotatable element, rotatable insulating means adapted to serve as a mounting means for the rotatable element, a shaft for the rotatable insulating means, the said means preventing contact between the rotatable element and the shaft, and separate mounting means for the said insulating means and the fixed element.

6. A variable condenser comprising a fixed element, a rotatable element, rotatable means on which the rotatable element is mounted, a shaft for the rotatable means, the said means insulating the rotatable element from the shaft, a terminal insulated from the fixed element, and a yielding connection between the terminal and the rotatable element whereby the shaft may have the same potential as the fixed element.

7. A variable condenser comprising a fixed element, a rotatable element, a rotatable means on which the rotatable element is mounted, a shaft for the rotatable means, the said means insulating the rotatable element from the shaft, a terminal insulated from the fixed element, and a spring connecting the rotatable element and the terminal whereby the shaft may have bearings in direct contact with the fixed element.

In testimony whereof I affix my signature.

WILLIAM DUBILIER.